No. 741,671. Patented October 20, 1903.

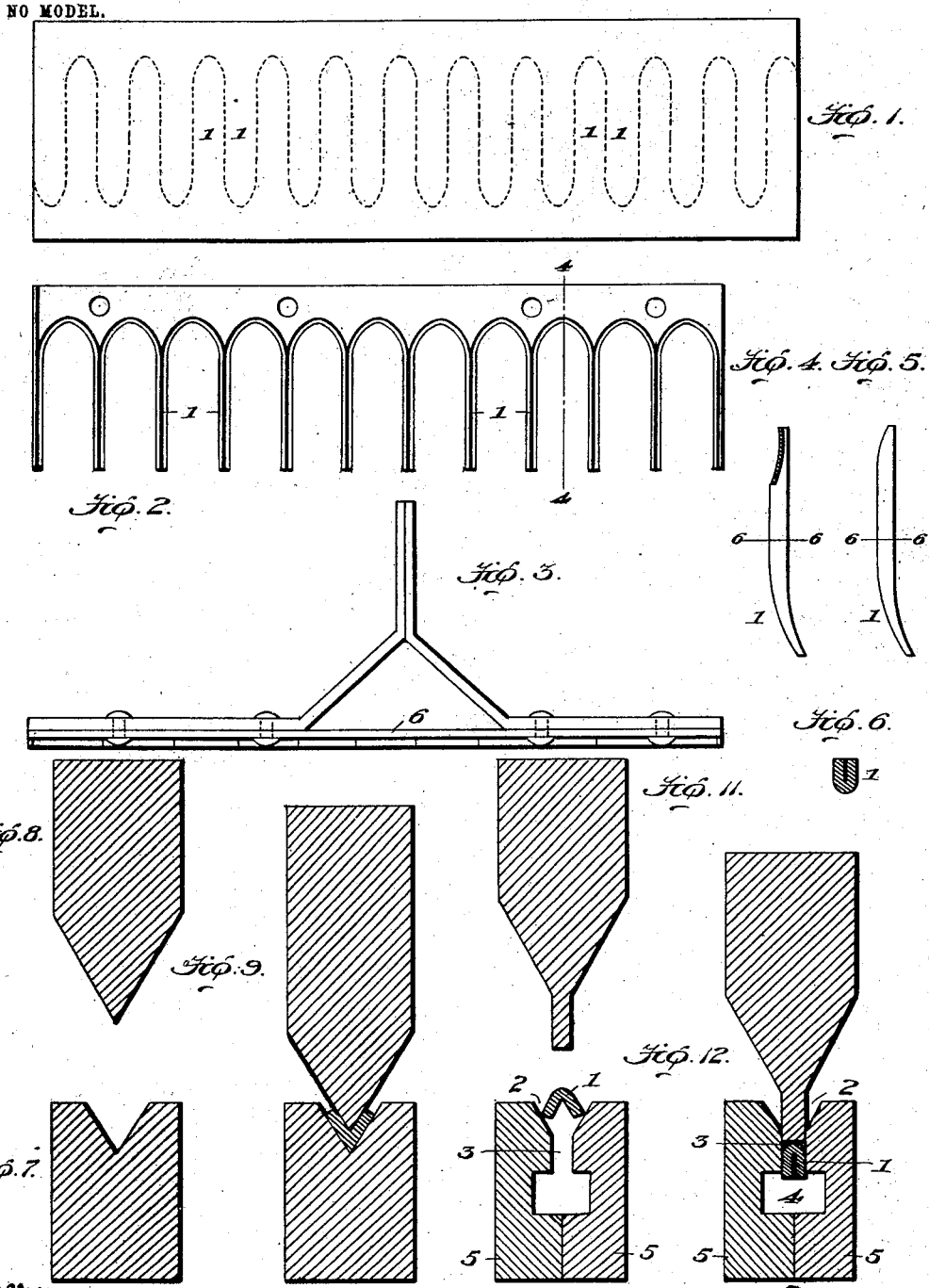

UNITED STATES PATENT OFFICE.

WILLIAM R. JENKINS, OF BELLEFONTE, PENNSYLVANIA.

ART OF MANUFACTURING RAKES.

SPECIFICATION forming part of Letters Patent No. 741,671, dated October 20, 1903.

Application filed December 26, 1902. Serial No. 136,708. (No model.)

*To all whom it may concern:*

Be it known that I, WILLIAM R. JENKINS, a citizen of the United States, and a resident of Bellefonte, in the county of Center and State of Pennsylvania, have invented a new and useful Improvement in the Art of Manufacturing Rakes, of which the following is a specification.

My invention relates to the art of manufacturing rakes, and has reference to the mode of construction; and the primary object is to provide a cheap strong rake which can be easily and quickly made and which will be light and easy to handle.

With these objects in view my invention consists in certain novel features of construction and combinations of parts, which will be hereinafter described, and pointed out in the claim.

In the accompanying drawings, Figure 1 is a plan view of the blank, the dotted lines showing how two rakes can be cut from one blank without any or very little loss of material. Fig. 2 illustrates a finished rake-head ready for the handle and may be termed a "back" view. Fig. 3 is a top plan view showing the tang-piece riveted to the head. Fig. 4 is a section on line 4 4 of Fig. 2. Fig. 5 is an end view. Fig. 6 is a section on the line 6 6 of Figs. 4 and 5. Fig. 7 is a view of the die used in giving the tines the first bend. Fig. 8 is the plunger used in conjunction with the die shown in Fig. 7. Fig. 9 shows the die and plunger, together with the metal of the tine held therebetween in V shape. Fig. 10 indicates the die used for closing the sides of the tines tight together. Fig. 11 is the plunger used with this die, and Fig. 12 shows these parts in operative position with the metal of the tine folded tight together.

The blank, of suitable size and dimensions, is first cut, as indicated in dotted lines, to form two rake-heads. One of these is then placed in a row of dies, such as illustrated in Fig. 7, and the plunger shown in Fig. 8 is forced down to the position illustrated in Fig. 9, giving the tines 1 1 the V shape indicated therein. After having been given this form the blank is reversed and placed in another set of dies, as illustrated in Fig. 10. These dies as illustrated have a V-shaped mouth 2, wide enough to embrace the outer edges of the blank and their function being to fold the sides of the blank together preparatory to entering the narrow throat 3, which in width is coextensive with the two folds of the blank when tight together. Beneath or adjacent to the throat is the enlarged chamber 4, into which the finished tine is forced by the plunger shown in Fig. 11. These dies (shown in Figs. 10 and 12) are preferably made in two sections 5 5, as indicated, to facilitate the making and the convenience of maintaining. After having been forced through these dies the rake-head has the appearance as illustrated in Figs. 2, 4, and 5. It will be seen that the teeth are double the thickness of the original plate and are also deeper through, thus producing a tooth which is strong in the direction necessary when in use. When completed, the tang-pieces 6 6 are riveted to the front surface of the rake, as illustrated in Fig. 3.

I am aware of the Ells rake, No. 226,051, patented March 30, 1880, in which the tines or teeth have a concavo-convex form, and I do not claim this construction. The principal advantage of my invention resides in the fact that the two walls of the teeth or tines are pressed close together. If this is not done and the tines are in a concavo-convex form, they will be too thick and present too much surface to the material to be acted on—such as earth, for instance—and would require too much effort on the part of the operator to be a desirable tool. In my rake this objection is overcome by forcing the tines through a die which will press the sides or walls close together, and this is done by means of the two forms of dies and plungers, as described, the blank first being bent into V shape, then reversed, and placed in the second form of die, the plunger, descending on the apex, driving the blank through the contracted throat of the die and in so doing closing the sides together, as shown in Fig. 12. In this way a simple, strong, light, and inexpensive article is produced.

Having fully described my invention, what I claim as new, and desire to secure by Letters Patent, is—

In the art of manufacturing rakes, the following, cutting a plate to form a blank with a strip of metal for each tooth or tine, bending these teeth or tines into V shape, then reversing the blank and forcing the tines
5. through a die having a constricted throat, whereby to force the sides of the metal forming a tine close together.

In testimony whereof I have signed this specification in the presence of two subscribing witnesses.

WILLIAM R. JENKINS.

Witnesses:
W. G. RUNKLE,
ROBERT COLE.